United States Patent Office 3,473,931
Patented Oct. 21, 1969

3,473,931
METHOD OF PREPARING COMPRESSED,
DEHYDRATED BAKED GOODS
Joseph M. Rispoli, Brooklyn, Thomas P. Finucane, Hartsdale, and Richard M. Sorge, Yonkers, N.Y., assignors to General Foods Corporation, White Plains, N.Y., a corporation of Delaware
No Drawing. Continuation-in-part of application Ser. No. 393,781, Sept. 1, 1964. This application Feb. 9, 1968, Ser. No. 704,272
Int. Cl. A21d 15/00, 13/00
U.S. Cl. 99—90                                    10 Claims

ABSTRACT OF THE DISCLOSURE

Fresh baked goods are autoclaved, dehydrated to a moisture content of 10–15% by weight, compressed, and then further dehydrated to a final moisture content of 8–10% by weight to produce a shelf stable product that will, when rehydrated, expand to its original size and possess the same fine qualities as the fresh commodity.

The invention herein described was made in the course of or under a contract with the Department of Defense, Department of the Army.

This application is a continuation-in-part of application Ser. No. 393,781, filed Sept. 1, 1964, and now abandoned.

The present invention relates to improved foodstuffs and, more particularly, to compressed dehydrated baked goods suitable for rapid rehydration.

While the nutritional importance of baked goods in dietetics is undisputed, the handling and transporting of large quantities of these foods is disadvantageous due to their relatively large bulk. At the same time the perishable nature of baked goods prevents their storage for extended periods of time. It has long been recognized that it would be advantageous to provide a method for reducing the bulk of baked goods for ease in handling and transportation, while increasing their storage stability and at the same time enabling them to be restored to their original bulk with their taste and textural qualities substantially unimpaired.

Tamet patented a process for preparing compressed, dehydrated bread that could be stored for long periods of time (Great Britain Patent No. 3,081 of 1875). It has been found, however, that bread prepared according to the Tamet disclosure does not rehydrate satisfactorily, and the rehydrated product is not suitable for the many ordinary uses of fresh bread, such as making sandwiches, because of its soggy and mushy texture. Furthermore, until the present time, no satisfactory method for preparing dried, compressed baked goods which will rapidly rehydrate to a product having all of the properties of the freshly prepared commodity has been available.

A process has now been discovered for preparing compressed, dehydrated baked goods which can be rapidly rehydrated to a product having all of the desirable qualities of the fresh product.

Accordingly, it is an object of the present invention to provide compressed, dehydrated baked goods which will rehydrate rapidly to provide organoleptically acceptable products having approximately the taste, texture and bulk of the fresh baked goods. It is another object to provide a method for preparing rapidly rehydratable compressed dehydrated baked goods. It is a further object of the invention to provide a method of increasing the storage stability of baked goods. These and other objects of the present invention will become apparent as the description proceeds.

In the present discussion the term "baked goods" includes all gelatinized, leavened farinaceous food products. The method of effecting gelatinization is not critical and this may be accomplished by means of hot air such as in baking; hot oil, as in deep fat frying; hot water or steam, as in boiling or steaming; or by direct contact with a heated surface, as in grilling. These foods all have, to some degree, a spongy cellular texture and when compressed, are capable of springing back to their original shape and texture upon release of the compressive forces. Typical foods which are included in the above defined group are baked materials, such as breads, cakes, and muffins; deep fat fried goods, such as doughnuts and fritters; grilled foods, such as pancakes and waffles; and boiled foods, such as boiled cakes and dumplings. The baked goods treated in accordance with the present invention may be whole or sliced to a convenient size. For example, a whole loaf of bread may be compressed and dehydrated or individual bread slices may be so treated.

According to the invention fresh baked goods of the class described are autoclaved at a pressure of about 5 to about 50 p.s.i.g. until the structure of the product reaches the desired degree of firmness. This can usually be achieved in about one to ten minutes, however, in some cases, as when whole loaves of bread are treated, longer periods of time may be necessary. The term "firming" is used to describe the phenomenon of toughening that the baked goods structure undergoes which enables it to spring back to its original condition upon rehydration. Generally it has been observed that the autoclaving pressure and time are inversely related, i.e., the higher the autoclaving pressure the shorter the autoclaving time needed to obtain the desired result. Preferably the baked goods are autoclaved at a pressure of about 5–30 p.s.i.g. and it has been found that the best results are obtained by autoclaving at a pressure of about 10–15 p.s.i.g. for about 5–15 minutes.

The moisture content of baked goods being autoclaved should be at least 18% by weight. It has been found that when the baked goods are autoclaved at moisture levels below about 18% the structure of the baked goods is not sufficiently firmed to effect complete expansion of the compressed product to its original state upon rehydration.

After autoclaving, the baked goods are dried to a moisture content of about 10 to about 20% before being compressed. If the baked goods have a moisture content below about 10%, they tend to shatter when compressed, while if they have a moisture content above about 20% they tend to plasticize and form a gummy mass which cannot be rehydrated and expanded. If the baked goods being treated already have a moisture content below 20% it may not be necessary to dehydrate it further to obtain satisfactory results. The drying may be carried out by any suitable means, for example, forced heated air drying, infrared drying, microwave energy drying, or vacuum drying. In the case of forced air drying, the drying time will decrease as the air temperature is increased. For example, in the case of individual slices of bread, drying would take about ½ hour at temperatures of about 200° F. and about 15 minutes at temperatures of about 215° F. Microwave energy drying may be carried out in from about 5 to about 30 seconds. A preferred method is to dry the baked goods to a moisture content of about 13% to about 15% by treating for about 45 minutes with forced air maintained at about 125° F.

When the moisture content of the baked goods reaches the desired level, it is compressed to about 5 to 50% of its original thickness. Preferably, it is compressed from about 25 to 50% that is, to about ¼ to about ½ of the original thickness. No particular type of apparatus is necessary for compressing the baked goods, any type of compressing means, e.g., a press, being suitable. Due to the nature of the material being compressed, only a low capacity compression unit is necessary. While the press plates may be heated if desired, temperatures of about 120° F. or higher should be avoided as this may cause the material being compressed to plasticize with resultant poor rehydration. If the plate temperature is maintained between 85° F. and about 100° F. and the baked goods are compressed for about 30 seconds, it does not plasticize or expand in the dry state and has good rehydration qualities. After being compressed the baked goods are preferably further dried to a moisture content of about 8% to about 10% and then packaged. The final drying step may not be necessary if the product is storage stable, will hold its shape at the moisture content at which it leaves the compressing machine, in which case the final drying step can be eliminated the baked goods can be packaged directly after compressing. The compressed product is now in a convenient form for storage and handling and, due to its greatly reduced bulk, substantially more of it may be stored in a given space.

The dried, compressed product may be readily reconstituted in various ways to provide a product having the same texture, bulk and taste as the original baked goods. It may be rehydrated, for example, by dipping it in water for about 3 seconds and then allowing it to expand or by wrapping it in wicking and contacting the wicking with water. When dipped the product is suitable for eating after standing for about 10 minutes. If the dried baked goods are packaged in a special wrapper it may be rehydrated directly in the package. Such a package may be composed of several layers, the outside layer consisting of a laminated foil and the inside layer of a suitable wicking paper. The package is so designed that after the package is opened, a given quantity of water is added but is prevented from immersing the bread by a heat-sealed barrier which forms a separate water compartment. The water is instead wicked through the paper onto the bread at a uniform rate. Dried baked goods may be rehydrated in approximately two hours in this type of a package. If desired, various additives may be mixed into the baked goods dough formulation to increase the rate of rehydration of the dehydrated product.

EXAMPLE I

Run 1

Fresh commercial bread slices were steam-autoclaved for 10 minutes at a pressure of 10 p.s.i.g. after which the slices were placed in a forced air dryer maintained at 125° F. and dried for 45 minutes to a moisture content of about 13–15% by weight. The dried bread slices were allowed to equilibrate in a sealed jar and were then compressed to ⅓ their original volume and held in the press for 30 seconds. The compressed bread slices were then dried to a final moisture content of about 8 to 10% by weight in a forced air drier maintained at 125° F. and packaged in a moisture proof container made of alternate layers of aluminum foil and polyethylene.

Run 2

Fresh commercial bread slices were air dried to a moisture content of about 8% by weight. The dried slices were steamed at atmospheric pressure in an autoclave for 10 minutes, after which they were compressed in a press to ⅓ their original volume and held for 30 seconds. The compressed slices were then dried to a final moisture content of about 8% and packaged in a moisture proof container as described in Run 1.

Run 3

Fresh commercial bread slices were steamed at atmospheric pressure for 10 minutes after which they were dried to a moisture content of 13–15% by weight. The slices were permitted to equilibrate in a sealed jar and were then compressed to ⅓ of their original volume and held in the press for 30 seconds. The compressed samples were then dried to a final moisture content of 8–10% by weight and packaged in a moisture-proof container as described in Run 1.

Samples from each of the above runs were rehydrated by submerging them in water for three seconds, shaking off the excess moisture and allowing them to lay on a paper towel for 10 minutes. Upon examination the Run 1 sample was found to have returned to its original shape and had execellent texture while the Run 2 and 3 samples were very soggy and did not satisfactorily expand to their original size. This example illustrates the importance of autoclaving the baked goods at elevated pressure and while still in the moist condition.

Samples prepared according to Run 1 were stored at 100° F. and 30% relative humidity and 90° F. and 85% relative humidity. After six months storage time they were evaluated by rehydrating them as described above. The rehydrated bread slices had the same fine texture and expanded to the same size as the original bread slices.

EXAMPLE II

Samples of compressed dried bread slices were prepared in accordance with the procedure of Run 1 of Example I except that the autoclaving pressure was varied. The results are tabulated in Table I.

TABLE I

| Run | Autoclave pressure, p.s.i.g. | Autoclave time, minutes | Sample evaluation upon rehydration |
|---|---|---|---|
| 1 | 5 | 15 | Good texture but slightly soggy. |
| 2 | 10 | 10 | Excellent texture, very closely resembled fresh bread. |
| 3 | 30 | 2 | Good texture, slight browning. |

This example shows that satisfactory results can be obtained at pressures as low as 5 p.s.i.g. and that the length of autoclaving time necessary to obtain the desired result decreases as the autoclave pressure increases.

EXAMPLE III

Samples of compressed dried bread were prepared in accordance with the procedure of Example I, Run 1 except that the moisture content at the time of autoclaving was varied to determine the effect of moisture on the quality of the baked goods. Results are tabulated in Table II.

TABLE II

| Run: | Moisture Content (Weight percent) | Sample Evaluation Upon rehydration |
|---|---|---|
| 1 | 15 | Soggy, soft texture. |
| 2 | 18 | Slightly moist, good texture. |
| 3 | 21 | Good texture and appearance. |
| 4 | 27 | Excellent texture and appearance. |
| 5 | 29 | Do. |
| 6 | 35 | Do. |

It was observed that as the moisure content of the bread being autoclaved was increased the quality of the product improved from unsatisfactory at 15% to excellent at full moisture content. This example shows that the baked goods being treated in accordance with the invention should have a moisture content of at least about 18% by weight during the autoclaving step.

EXAMPLE IV

Rye bread, whole wheat bread, hard rolls, French bread, a whole loaf of white bread and fried donuts were treated in accordance with the procedure of Example I, Run 1, All of these materials except the loaf of white bread were autoclaved at 10 p.s.i.g. for 10 minutes at their normal moisture content. The loaf of white bread was autoclaved at 10 p.s.i.g. for one hour. The French bread was compressed transversely from top to bottom. Controls were prepared in the same way except that the autoclaving step was omitted. In each case the autoclaved sample rehydrated more fully and had a better texture and appearance than the control. This example shows that the process of the invention can be used with various leavened, farinaceous foods.

Although the invention has been described with reference to specific examples it is understood that the scope of the invention is limited only by the breadth of the appended claims.

What is claimed is:

1. A method of preparing compressed, dehydrated baked goods comprising autoclaving fresh baked goods at a pressure of from about 5 to 50 p.s.i.g. for a period of time sufficient to firm the structure of said baked goods and compressing said autoclaved baked goods at a moisture content of about 10–20% by weight to less than about 50% of their original volume.

2. A method according to claim 1 wherein the moisture content of the fresh baked goods during the autoclaving step is at least 18% by weight.

3. A method according to claim 2 wherein said autoclaving pressure is about 10–15 p.s.i.g.

4. A method according to claim 3 wherein the baked goods are autoclaved for about 2–15 minutes.

5. A method according to claim 1 wherein the moisture content of the autoclaved baked goods during the compression step is about 13–15% by weight.

6. A method according to claim 1 wherein said autoclaved, compressed baked goods are dried to a final moisture content of less than about 10% by weight.

7. A method of preparing compressed, dehydrated baked goods comprising autoclaving fresh baked goods at a pressure of from about 5 to 50 p.s.i.g. for a period of time sufficient to firm the structure of said baked goods, reducing the moisture content of said autoclaved baked goods to about 10–20% by weight and compressing said baked goods to a volume of less than about 50% of their original volume.

8. A method of preparing compressed, dehydrated baked goods comprising autoclaving fresh baked goods having a moisture content of at least 18% by weight at a pressure of about 5 to 30 p.s.i.g. for a period of time sufficient to firm the structure of said baked goods, reducing the moisture content of said autoclaved baked goods to about 10–20% by weight, reducing the volume of said baked goods to less than 50% of their original volume and drying said baked goods to a final moisture content of less than about 10% by weight.

9. A method according to claim 8 wherein said compressed, dehydrated baked good are packaged in a moisture-proof container.

10. A method of preparing compressed, dehydrated bread comprising autoclaving fresh bread at a pressure of about 10 to 15 p.s.i.g. for a period of time sufficient to firm the structure of said bread, drying said bread to a moisture content of about 13–15% by weight, compressing said bread to less than about half of its original volume and drying said bread to a final moisture content of less than 10% by weight.

References Cited

UNITED STATES PATENTS

| | | | |
|---|---|---|---|
| 107,088 | 9/1870 | Mouries | 99—90 |
| 137,766 | 4/1873 | Even | 99—90 |
| 2,350,935 | 6/1944 | Sipe | 99—90 |

FOREIGN PATENTS

| | | |
|---|---|---|
| 3,081 | 1875 | Great Britain. |
| 16,650 | 1901 | Great Britain. |

RAYMOND N. JONES, Primary Examiner

U.S. Cl. X.R.

99—86, 199